Patented Apr. 29, 1952

2,594,937

UNITED STATES PATENT OFFICE 2,594,937

FLAME RETARDING COMPOSITION

Edgar A. Lauring, International Falls, Minn., assignor to Minnesota and Ontario Paper Company, Minneapolis, Minn.

No Drawing. Application September 6, 1949, Serial No. 114,280

7 Claims. (Cl. 260—18)

This invention relates to flame retarding composition intended for application to a cellulosic material, particularly to fiber insulation board and to other objects, and aims to provide a novel composition characterized by good resistance to both flame propagation and afterglow.

The composition of the invention may be applied as a surfacing material to fiber insulating wallboard, wood, paper and the like where flame retarding properties will be useful. The composition may also be applied to incombustibles, such as gypsum building board.

A great many compositions have been considered and reconsidered for reducing flammability of fiber composition board and similar material, but most of the compositions recommended are extremely expensive and often do not have the qualities of flame and afterglow reducing characteristics and being economical to make and at the same time the coating provides a degree of washability.

Other and further objects of the invention and advantages of the same will be pointed out hereinafter and indicated in the appended claims or be obvious to one skilled in the art upon understanding the present disclosure.

While one embodiment of the invention has been described more or less in detail to comply with the requirements of the statute, it is nevertheless desired that this detailed description be considered merely as illustrative and not as limiting and it is to be understood by those skilled in the art without departing from the spirit of the invention that many modifications may be made that will fall within the scope of the appended claims.

In accordance with the invention, fire resistant and flame retardant properties are imparted to the fiber board or other combustible materials by applying to the same a layer of chemicals which is adherent, stable and potentially reactive and which, when subjected to heat, puffs up or forms a foam which excludes the air and provides an insulating barrier against the heat. Thus the combustible material is protected from damage by destructive distillation or by combustion to a sufficient degree to resist ignition and to prevent the spread of flames.

The invention broadly consists of an inorganic foam producing substance and inert pigments suspended in a thermoplastic vehicle which might be termed a "paint vehicle," where the term "paint vehicle" is intended to mean a combination of resins, drying oils, driers and thinners.

The composition comprises a thermoplastic varnish, driers, solvents, sodium tetraborate compounds, boric acid, a supporting filler pigment, and a high hiding pigment. The ratio of the pigment to the binder (varnish) should be between 6 to 1 and 10 to 1, preferably within a range of 8 to 1. The filler and hiding pigment should not constitute more than 50% of the total pigment. About ⅓ of the filler and hiding gives the maximum flame retarding qualities.

The thermoplastic binder, or varnish, must be such that it retains a thermoplastic character after aging and complete oxidation and polymerization of its drying constituents. It has been found that this varnish may be either a heat bodied resin oil combination, an alkyd, or a cold cut varnish of a thermoplastic resin and a drying or semi-drying oil.

It is preferred to use a thermoplastic resin of a melt point (ring and ball) of about 140 to 150, preferably around 145° C., together with a bodied linseed oil cold cut in a solvent. The preferred resin is of a modified phenolic type. One resin that has worked exceedingly well has a melt point of 142 to 149° C., acid number within a range of 10 to 20, a specific gravity of 1.10 and viscosity in poise of 3.3 at 56% solids in toluene. A similar resin to this is sold under the trade-mark "Amberol F-7" rosin modified phenol aldehyde resin. A bodied linseed oil that is satisfactory is sold under the trade-mark "Linogel 85." As an example of the fire retarding coating composition that gives excellent results:

| | Parts |
|---|---|
| Modified phenolic resin (Amberol F-7) | 25 |
| Bodied linseed oil (Linogel 85) | 25 |
| Drier (cobalt naphthenate 6%) | .45 |
| Drier (lead naphthenate 16%) | 1.35 |
| Solvent (xylol) | 115 |
| Solvent (V. M. P. naphtha) | 90 |
| Sodium tetraborate 5H$_2$O, powdered | 214 |
| Boric acid, powdered | 53 |
| Calcium carbonate (Atomite) | 107 |
| Lithopone medium oil absorption | 27 |

The type of solvent that is employed depends on what is necessary to cut the resin. The resin above-indicated requires a mixture of about 50% xylol and about 50% naphtha. It is also important to consider the drying characteristics when selecting a solvent.

It has been found that modified phenolics, modified rosin malic resins give highly desirable results in the particular composition, taking everything into consideration, such as body, leveling, strike in flameproofing, afterglow and rapid drying.

The sodium tetraborate compound may be ordinary borax containing 10 moles of water (52.8% anhydrous equivalent). However, it has been discovered that the sodium tetraborate with 5 moles of water (69.3% anhydrous equivalent) is at least about twice as effective as the 10 moles of water variety. It has been discovered that if the 10 mole variety (borax) is dried until it has a uniform anhydrous sodium tetraborate equivalent between 69.3% to 80%, this combination is equally as good as the 5 mole variety. Calcined borax, which has an anhydrous equivalent of 77% is satisfactory.

Sodium tetraborate is found in nature in two crystal forms, one containing the 10 moles of water and the other 5 moles of water. Both of these compounds are stable at normal temperature and humidities. It also appears that the 10 mole variety, after being dried to somewhat over 69.3% anhydrous equivalent but less than 100%, reverts to the 5 mole variety after aging at normal humidities. However, if subjected to extreme humidities and and temperatures it reverts to the 10 mole variety. Therefore, in general, it is recommended that the 5 mole variety be employed in producing flame retarding coating composition.

The sodium tetraborate compounds should be pulverized to a fineness such that 90% or more passes about 300 to about 325 mesh screen, so that they serve as pigments in the paint as well as for other purposes. The sodium tetraborate compound, together with the thermoplastic binder, produces an intumescent coating under the action of heat. In other words, the coating puffs up to a fluffy, light, dry, nonsticky froth, of bubbles and bursted bubbles. Most of the bubbles in the composition are so small as not to be apparent as bubbles. The production of a composition of extremely small bubbles is important.

The boric acid basically is used to prevent afterglow; however, it does have the effect on the intumescent effect of the borax. It has been found that a mixture of four parts of sodium tetraborate of the 5 mole variety with one part of boric acid gives the best all around results. The boric acid employed is powdered so it can act as a pigment as well as the sodium tetraborate.

For a filler pigment, in general, nearly all pigment works; however, it has been found that calcium carbonate is the best since it contributes to the intumescence of the coating. Calcium carbonate is actually a supporting filler pigment. On the other hand, calcium carbonate contributes very little to hiding, so for non-yellowing and high hiding coatings, lithopone or its equivalent is recommended. The high hiding pigments may be any of the pigments falling in this general classification. However, it has been found that lithopone and barium sulfate are the best since they also act as supporting pigments, though not as much as calcium carbonate. In the formula hereinbefore set forth, 66⅔% of the pigment is actual flameproofing chemicals and the remaining ⅓ a mixture of 80% calcium carbonate and 20% lithopone. However, if a higher hiding, non-yellowing coating is desired, 75% active flameproofing chemicals with 25% lithopone gives excellent results. The flameproofing qualities of both would be about the same; however, the latter costs more.

When a surface coated with compositions taught by this invention is exposed to igniting temperatures, the igniting mechanism is believed to work as follows: the sodium tetraborate, and to a degree the boric acid and supporting pigment, together with the thermoplastic binder, produces intumescence of the coating. The coating is puffed up to a fluffy, light, nonsticky froth of fine bubbles. The froth prevents the spread of the flame and the boric acid prevents or retards to a great degree afterglow when the igniting temperature has been removed.

The coating is of such a finish that if any definite color is desired it is necessary to incorporate therein opaque coloring material or materials to provide the desired esthetic effects and to absorb actinic rays.

The coating composition has non-warping characteristics when applied to fiber composition and other boards. Also, the coating is highly scuff resistant.

1. A flame retardant composition adapted for surface application to fiber composition board comprising a thermoplastic paint vehicle, powdered sodium tetraborate 5H$_2$O as an inorganic foam-forming ingredient suspended in the paint vehicle, a pigment consisting of about 80 per cent of calcium carbonate and about 20 per cent lithopone, and boric acid.

2. A flame retardant composition adapted for surface application to fiber board, which is non-reactive with said material at ordinary temperatures and comprises a rosin modified phenol aldehyde thermoplastic resin having a specific gravity of about 1.10 and a viscosity in poise of about 3.3 at 56% solids in toluene, a bodied drying oil, driers, solvent, powdered sodium tetraborate 5H$_2$O, powdered boric acid, a calcium carbonate filler pigment and a high hiding power pigment.

3. A flame retardant and potentially heat insulating compound comprising a binder composed of a modified phenolic resin having a melt point (ring and ball) of about 140° to about 150° C. and an acid number of 10 to 20 and bodied drying oil; powdered sodium tetraborate 5 H$_2$O, powdered boric acid, solvent and pigment the said sodium tetraborate present in the amount of about 4 to 1 to the powdered boric acid.

4. A flame retarding composition adapted for surface application to fiber composition board comprising rosin modified phenolic aldehyde resin having a melting point of about 140° C. to about 150° C., a bodied drying oil in an amount equivalent to the amount of the resin used, powdered sodium tetraborate 5 H$_2$O, powdered boric acid in amount of about one-fourth of the amount of sodium tetraborate used, a solvent and pigment.

5. A flame retarding composition comprising a paint vehicle, powdered sodium tetraborate 5 H$_2$O, powdered boric acid, a solvent and a pigment, said pigment consisting of a large part of calcium carbonate filler pigment and a smaller part of high hiding power pigment.

6. A flame retardant composition comprising a rosin modified phenolic formaldehyde thermoplastic varnish, driers, solvents, sodium tetraborate 5H$_2$O of a size that about 90% will pass about 300 to about 325 mesh screen, powdered boric acid, a supporting filler pigment and a high hiding power pigment, the ratio of the pigment to the varnish being within a range of about 8 to about 1.

7. A flame retardant composition comprising 25 parts of thermoplastic phenolic resin having an acid number of about 10 to about 20 and a melting point of about 140° C. to about 150° C., 25 parts of bodied linseed oil, 0.45 parts of cobalt napthenate, 1.35 parts of lead napthenate, 115 parts of xylol, 90 parts of naphtha, 214 parts of pulverized sodium tetraborate containing per mol about 5 mols of water of crystallization, 53 parts of powdered boric acid, 107 parts of calcium carbonate, and 27 parts of lithopone.

EDGAR A. LAURING.

REFERENCES CITED

The following references are of record in the file of this patent:

UNITED STATES PATENTS

| Number | Name | Date |
|---|---|---|
| 1,612,672 | Vivas | Dec. 28, 1926 |
| 1,717,561 | Hopkins | June 18, 1929 |
| 2,268,002 | Waldie | Dec. 30, 1941 |
| 2,272,577 | Penn | Feb. 10, 1942 |

OTHER REFERENCES

Paint Oil & Chemical Review, Nov. 1945, pages 129–136.

Fire Retarding Coatings, U. S. Dept. Agriculture, No. R1280, Sept. 1942, pages 1–8.

Lucifer, Silk Journal & Rayon World, Nov. 1942, pages 19, 20, and 22.